United States Patent [19]

Ogata et al.

[11] Patent Number: 4,532,409
[45] Date of Patent: Jul. 30, 1985

[54] METHOD FOR GAS SHIELDED ARC WELDING WITH DIRECT CURRENT NON-CONSUMABLE ELECTRODE

[75] Inventors: Yohji Ogata; Isao Aida; Hirokazu Murayama; Kenjiro Shibuya, all of Kanagawa, Japan

[73] Assignee: Kabushiki Kaisha Kobe Seiko Sho, Kobe, Japan

[21] Appl. No.: 251,971

[22] Filed: Apr. 6, 1981

[51] Int. Cl.$^3$ .............................................. B23K 9/00
[52] U.S. Cl. ........................... 219/137 R; 219/125.12; 219/137 PS
[58] Field of Search ...................... 219/137 R, 75, 123, 219/125.12, 137 PS

[56] References Cited

U.S. PATENT DOCUMENTS

| 3,122,629 | 2/1964 | Manz ................................. 219/137 R |
| 3,163,743 | 12/1964 | Wroth et al. ..................... 219/137 R |
| 3,549,856 | 12/1976 | Saenger, Jr. ......................... 219/123 |
| 3,989,921 | 11/1976 | Ohi et al. .......................... 219/125.12 |
| 4,136,273 | 1/1979 | Eujita et al. ............................ 219/75 |
| 4,270,037 | 5/1981 | Grinin et al. ............................ 219/75 |
| 4,336,441 | 6/1982 | Godai et al. .......................... 219/123 |
| 4,356,372 | 10/1982 | Inscho et al. .......................... 219/75 |

FOREIGN PATENT DOCUMENTS 2037639 7/1980 United Kingdom .

OTHER PUBLICATIONS

"R&D" Kobe Steel Engineering Reports, vol. 30, No. 2, Apr. 1980.
International Conference of the Welding Institute, materials, May 1979.

Primary Examiner—C. C. Shaw
Attorney, Agent, or Firm—Oblon, Fisher, Spivak, McClelland & Maier

[57] ABSTRACT

A gas shielded arc welding method in which a non-consumable electrode and a filler wire are respectively connected to independent DC power sources and the non-consumable electrode is located in a preceding position, feeding the filler wire from behind the electrode. The non-consumable electrode is held in a forwardly tilted position to form an angle smaller than 85° with a workpiece, and the non-consumable electrode and filler wire are applied with inverse electric currents to thereby control the arc direction for formation of sound joints. A welding apparatus is also disclosed which is capable of effecting arc extension control and oscillation simultaneously.

7 Claims, 26 Drawing Figures

FIG.9(c)   $\theta_4 = 60$

FIG.9(b)   $\theta_4 = 45$

FIG.9(a)   $\theta_4 = 35$

METHOD FOR GAS SHIELDED ARC WELDING WITH DIRECT CURRENT NON-CONSUMABLE ELECTRODE

BACKGROUND OF THE INVENTION

1. Field of the Invention

This invention relates to a method and an apparatus for direct current non-consumable electrode gas shielded arc welding, which permit high-speed welding in all positions while suitably preventing magnetic blows.

2. Description of the Prior Art

Non-consumable electrode gas shielded arc welding or tungsten electrode inert gas arc welding (hereinafter referred to as "TIG welding" for brevity) is generally recommended for welding large structures but has the following accompanying drawbacks:

(1) upon raising the welding speed to a high level, there occurs incomplete fusion between the base metal and deposited molten metal due to insufficient preheating of the base metal, and (2) direct current TIG arc is susceptible to influences of ambient magnetic field imposed by variations in magnetization and the shape of the workpiece. As a result, magnetic blows are often experienced and, especially when it is deflected toward a previously formed bead, such give rise to such problems as incomplete fusion owing to insufficient preheating of the base metal, undesirable reductions in welding speed and remelting of the bead. Particularly, in the latter case, the bead sometimes falls off during operations in a vertical upward position or in an overhead position.

In view of the above-mentioned drawbacks, the assignee of the present inventors proposed in prior application (Japanese patent application No. 133005/78, laid open to public inspection under No. 61384/78) a method which eliminates the drawbacks noted hereinabove by counteractively utilizing the magnetic blow phenomenon. According to this method:

(A) a DC electrode is located between a non-consumable electrode and a base metal and between a filler material and the base metal; and (B) current is conducted through the respective electrodes, (i) in inverse directions when the non-consumable electrode is in a preceding position, and (ii) in the same direction when the filler material is in a preceding position;

(C) whereby directing the arc forward in a path of travel is possible.

Figure 1:
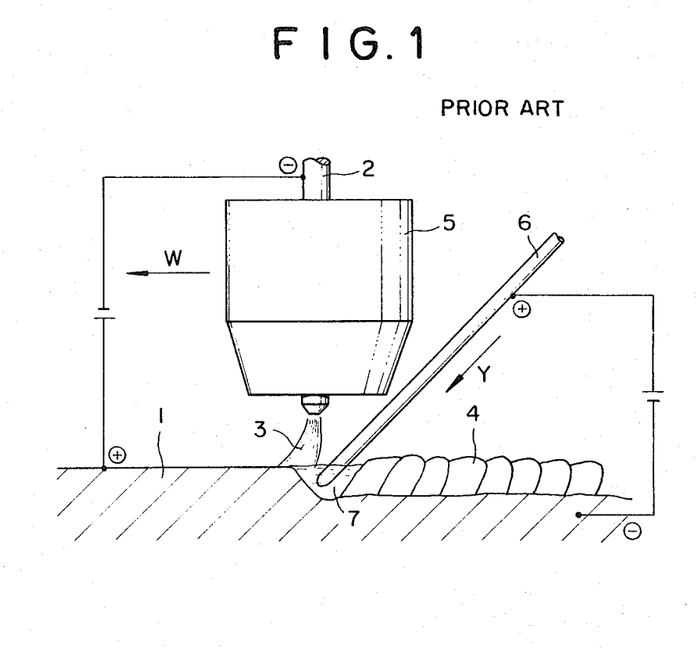
FIG. 1 is a schematic illustration of direct current TIG welding which underlies the concept of the present invention.

Referring to FIG. 1 which schematically illustrates the step (B)-(i) and in which the welding operation proceeds in the direction indicated by arrow W, a shielding gas cup 5 and a tungsten electrode 2 are located forward of a filler metal wire 6 which is fed in the direction of arrow Y to follow the movement of the electrode on the rear side thereof. In this figure, reference numeral 3 denotes an arc, 4 a bead and 7 a molten pool. When the tungsten electrode 2 is imparted with a direct current of forward polarity as shown, the filler metal 6 constitutes an anode (the base metal 1 constitutes a cathode). With a direct current of inverse polarity, such are located in inversed relations. As a result, the electrode 2 and filler metal 6 carry current flows of opposite directions and the electromagnetic forces produced by the magnetic fields of these currents act repellingly with each other according to Flemming's left-hand rule, so that the arc column is deflected in a direction away from the filler metal wire 6.

Figure 2:
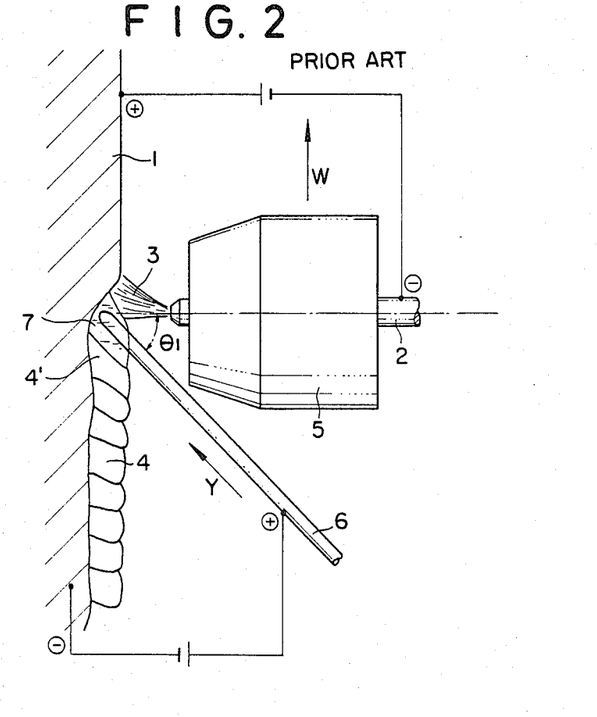
FIG. 2 is a schematic illustration of the direct current TIG welding of FIG. 1 as applied to a vertical position.

In an attempt to allow for high speed direct current TIG welding by employment of the above-described method and for the purpose of weaving the arc along a path of travel, the assignee of the present inventors further proposed in prior application (Japanese patent application No. 138004/78, preliminarily published under No. 61383/80) a method of conducting a pulsated current through the filler metal. Thus, direct current TIG welding substantially overcomes the above-mentioned drawbacks and has come to be applied more frequently to large structures. However, difficulties are still encountered in all-position welding, especially, in vertical position welding. Namely, referring to FIG. 2 which illustrates the welding method of FIG. 1 as applied to an operation in vertical position and which is substantially the same as FIG. 1 except for the difference in the angle formed by the front face of the molten pool and the base metal, the filler wire 6 must not be contacted with the electrode 2 and gas cup 5 and, even if not in contact with them, should not contaminate the electrode 2. Therefore, it is necessary to keep a suitable angular space $\phi_1$ between the filler wire 6 and the electrode 2. The filler wire 6 is dipped in the molten pool 7 as illustrated but, since the surface area of the molten pool 7 as seen from the feed direction of the filler wire 6 is very small, especially in a vertical position and the freshest bead 4' immediately beneath the molten pool is still in semi-solidified or solidifying state, the filler wire 6 is apt to be accidentally hit or caught on the bead 4'. These problems sometimes compel interruption of the welding operation and, if not, leave bruises and depressions on the bead surfaces and thus can be a cause of joint defects. The just mentioned problems are not limited to operations in vertical position and also occur in a case where the filler wire is fed at a high feed rate to hinder wide applications of the above-mentioned prior inventions.

On the other hand, U.S. Pat. Nos. 3,122,629 and 3,549,856 disclose consumable electrode gas shielded arc welding processes using a couple of power sources. Further, methods for electromagnetically controlling an arc in non-consumable electrode gas shielded arc welding are disclosed in U.S. Pat. No. 3,163,743, U.K. patent application No. 2,037,639, "R & D" Kobe Steel Engineering Reports Vol. 30, No. 2 April 1980, and materials of International Conference of The Welding Institute in May 1979.

SUMMARY OF THE INVENTION

With the foregoing in view, the present invention has as its object the establishment of a direct current TIG welding method which is free of the above-mentioned drawbacks and difficulties. More particularly, the present invention resides in a direct current TIG welding method of the class in which a non-consumable electrode and a filler wire are located respectively in anterior and posterior positions as mentioned hereinbefore, the method including the step of passing electric current of opposite polarities through the non-consumable electrode and filler wire while holding the non-consumable electrode in a forwardly inclined posture.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 3:
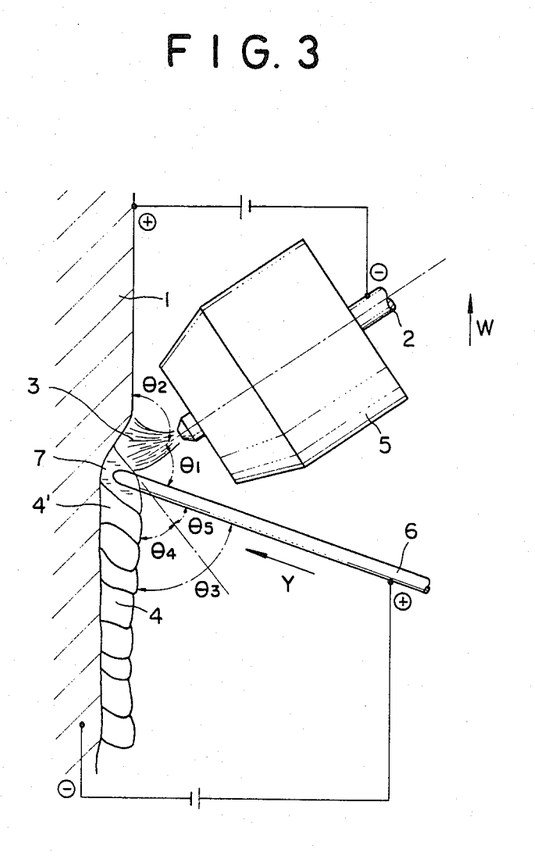
FIG. 3 is a schematic illustration of a method according to the present invention.

Referring to FIG. 3 which illustrates a vertical upward welding operation according to the present invention, an electrode 2 and a shielding gas cup 5 are held in a forwardly tilted posture as seen in the direction of travel so that there is ample space over (on the right side of FIG. 3) a molten pool 7 which is formed on the posterior side in the travel direction. Therefore, although the surface area of the molten pool 7 is very small when seen in the feed direction of the filler wire 6 as mentioned hereinbefore, the filler wire 6 can be fed from a direction spaced away from the surface of the base metal 1, namely, in a direction approximately perpendicular to the surface of the base metal 1. Now, presuming the angle of intersection of the electrode 2 and filler wire 6 to be $\theta_1$ as mentioned before, the angle of forward inclination of the electrode $\theta_2$, the angle of intersection of the filler wire 6 and surface of the welded base metal $\theta_3$, and the angle of intersection of the surface of molten pool 7 and surface of the welded base metal $\theta_4$, there is a limit to the reduction of angle $\theta_1$ and, in order to increase angle $\theta_3$ (more particularly to have $\theta_3 > \theta_4$), it is necessary to reduce angle $\theta_2$. In this connection, one of the essential conditions of the present invention is $\theta \leq 85°$. However, when angle $\theta_2$ is reduced, the arc tends to be directed in the axial direction of the electrode and it becomes necessary to apply a large electric current to the wire in order to perform satisfactory welding by sufficient arc deflections.

The increase of current to the wire is undesirable since it will be melted by generation of higher Joule heat and detached from the molten pool, increasing the possibility of bead drooping or falling. This problem can be prevented by increasing the feed rate of the wire but an excessive deposition rate will result in a defective joint.

Figure 9A:
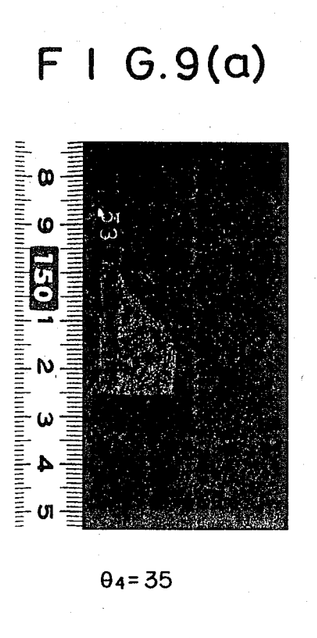
FIGS. 9(a) to 9(c) are photos showing cross-sections of vertical welding beads formed according to the present invention.
Figure 9B:
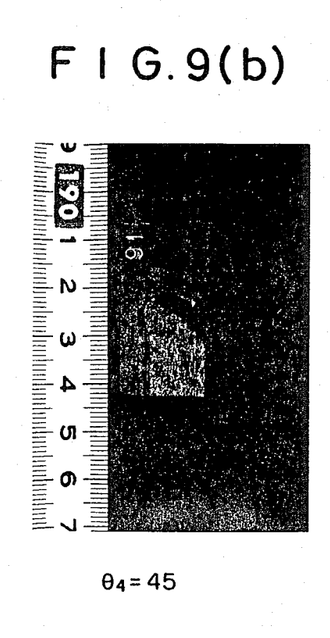
Figure 9C:
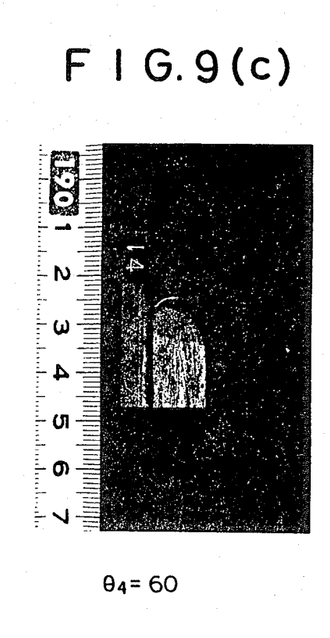

In a range of satisfactory vertical position welding, angle $\theta_4$ as illustrated in FIGS. 9(a) to 9(c) is up to 60°. In a position other than vertical welding, namely, in horizontal, downhand and overhead positions, angle $\theta_4$ becomes that in the vertical position or smaller than 45°.

With regard to $\theta_3$, the equation: $\theta_3 \geq \theta_4$ has to be satisfied because if $\theta_3 < \theta_4$, the filler wire fails to reach the molten pool and tends to be hit or caught on the solidifying bead. A problem of this nature sometimes compels interruption of the welding operation or forms bruises or depressions on the bead surface, which might invite a defective weld. Thus, occurrence of such a problem can suitably be prevented in all-position welding by having $\theta_3 \geq 60°$.

The foregoing discussion deals with the cases where the angle $\theta_4$ is maximum. The value of $\theta_4$ varies depending upon the welding conditions, including the welding position, and normally $35° \leq \theta_4 \leq 60°$.

With regard to $\theta_1$, it should not be too small since otherwise it will cause burn-back of the wire or arcing or spattering thereof with an increased frequency due to irregularities in its feed rate, contaminating the non-consumable electrode to such a degree as will make it difficult to produce a good weld. Therefore, angle $\theta_1$ may be such that $20° \leq \theta_1 \leq 60°$, but it is preferred to be such that $30° \leq \theta_1 \leq 50°$. Desirably, angle $\theta_1$ should not be too large in order to secure a large angle for $\theta_3$. In this connection, a difference from U.S. Pat. No. 3,549,856 concerning MIG welding is recognized in that in MIG welding it is necessary to produce a strong magnetic field by inserting the wire at an angle of 20°–30° with the axis of the arc in order to deflect the MIG arc of high stiffness. On the other hand, in TIG welding with which the present invention is concerned, the arc has lower stiffness as compared with MIG arc welding so that it can be deflected with a lower current even in a situation employing a large angle for $\theta_1$. That is to say, sufficient arc deflection can be effected by a weaker magnetic field as compared with MIG welding. For these reasons, an angle of 45° is preferred for $\theta_1$ in the present invention.

If $\theta_1 = 45°$, then $\theta_2 = 135° - \theta_3$ and $\theta_3 = 135° - \theta_2$ from $\theta_1 + \theta_2 = 180° - \theta_3$, and substituting $\theta_3 = 35°$ and $\theta_3 = 60°$ from $\theta_3 \geq \theta_4$ and $35° \leq \theta_4 \leq 60°$, it can be seen $\theta_2 \leq 75°$ and $\theta_2 \leq 100°$. As a matter of fact, $\theta_5 = 0$ being disadvantageous to the operation, it is safer to have $\theta_5$ at about 15°, and thus $\theta_2 \leq 60°$ and $\theta_2 \leq 85°$. However, in a situation where a small angle is employed for $\theta_2$, it becomes difficult to prevent bead drooping and falling as mentioned hereinbefore. Therefore, $60 \leq \theta_3 \leq 85°$ is preferred. Further, it can be seen that $50° \leq \theta_3 \leq 75°$ from the relation between $\theta_5$ and $\theta_4$.

Figure 4A:
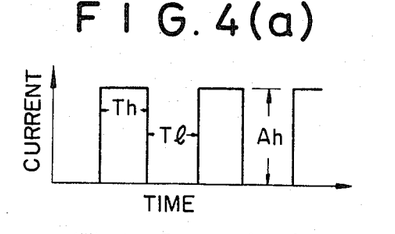
FIGS. 4(a) to 4(e) are diagrammatic views showing various waveforms of pulsated current for weaving an arc.
Figure 4B:
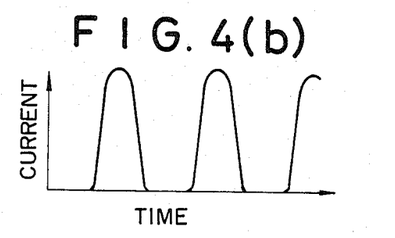
Figure 4C:
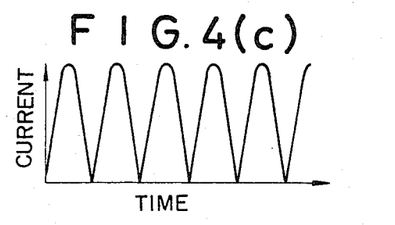
Figure 4D:
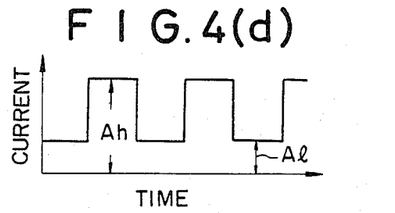

The method of the present invention is effective not only in a vertical position welding operation as exemplified but also welding operations in every position, and can find wide applications in all-position welding, horizontal solo welding, and side position solo welding and the like. Thus, it has become possible to raise the welding speed while effectively preventing magnetic blows in direct current TIG welding. However, in order to produce the effect in a more pronounced degree, it is recommended to employ an arc weaving method as proposed in Japanese patent application 133004/78 (Laid-Open Patent Application No. 61383/80) mentioned hereinbefore. More particularly, the increase in welding speed normally invites production of blow holes so that there have to be provided some countermeasures. Further, although the present invention employs a filler wire which is imparted with electric current as mentioned hereinbefore, it is not the so-called hot wire method since the wire itself is not heated. Therefore, in the event that the fore tip end of the filler wire is detached from the molten pool for some reason, there is a possibility of the filler wire being thereafter continuously fed onto a solidifying bead. The arc weaving method is one measure which solves this problem. The aforementioned prior application proposes a method which produces undulations in the intensity of magnetic field (including drops to zero level), without resorting to a mechanical apparatus by conducting a pulse current through the filler wire. This method utilizes high flexibility of the TIG arc, which can be pulled back toward the filler wire from a fore deflected position by weakening (or zeroing) the conducting current and can be deflected forward again by increasing the conducting current. It is possible for the present invention to employ this method substantially as it is, supplying a pulse current of any one of waveforms as exemplified in FIGS. 4(a) to 4(e). The schematic sketches of welding conditions illustrated in FIGS. 4(f) and 4(g) are of a horizontal welding operation, in which the welding or travelling direction is indicated by an arrow W but the molten pool, welding bead, shielding gas cup are omitted for simplicity of illustration. Of the waveforms shown in FIG. 4(a) to 4(e), the states of arc deflection by the waveforms shown in FIGS. 4(a) and 4(d) are illustrated on the right of the respective waveforms. The conducting and non-conducting states are alternately repeated in each of the waveforms shown in FIGS. 4(a) to 4(c) but the non-conducting state in the waveform of FIG. 4(c) has almost no time span. In the waveforms shown in FIG. 4(d) and 4(e) which waveforms are constantly in a conducting state, high and low states (Ah) and (Al) are alternately repeated to form a pulsed current. The reference character (Th) indicates a high level period and (Tl) a low (or zero) level period. It will be understood that the states of arc deflection in the respective periods can be changed by varying the amplitude of carrying current. The waveform of FIG. 4(e) in which current is finely fluctuated in both upper and lower periods is also useful in the present invention. Thus, the weaving width (or weaving angle) and weaving cycle can be arbitrarily adjusted by selecting suitable values for (Ah), (Al), (Th) and (Tl). The behavior in weaving paths or at opposite ends of oscillations can also be freely adjusted by varying the value of carrying current. For example, in a situation where the position of welding is changed successively to and from overhead, vertical and downhand positions as in circumferential butt welding of pipes, the method of the present invention has a particular significance in that an optimum weaving pattern can be selected to cope with sequential variations in the direction of gravitational force acting on the molten pool.

Further, in an ordinary one-side backing welding, as soon as an abnormality such as a variation in the beveling root gap, an irregularity or an error in the root face is met along the weld line, the amplitude of TIG current is varied correspondingly, as a result varying the temperature and shape of the arc as well as the size of the molten pool. Therefore, it is necessary to vary the melting rate of the filler wire by synchronizing the variations in the amplitude of TIG current with the feed rate of the filler wire. However, adjustment of this sort is extremely complicated in contrast to the above-mentioned method which can cope with abnormalities simply by varying the amplitude of the current applied to the filler wire. Some measures in this regard are listed below.

(1) For example, considering a case where the thickness of the root face abruptly increases during a welding operation with a current pattern of FIG. 4(a), the back bead in that portion is difficult to form without aid. In this instance, if an adjustment is made to increase the amplitude of the high level current (Ah), the angle of forward deflection of the arc column is increased to act directly on a beveling root surface in a fore non-desposited metal portion. As a result, the root portion is melted sufficiently to permit formation of the back bead.

(2) In a similar case, the forwardly directed period of the arc can be extended to ensure sufficient penetration by increasing the conduction time period of the filler wire.

(3) Also in a similar case, it is possible to employ a combination of the foregoing measures (1) and (2).

Figure 4E:
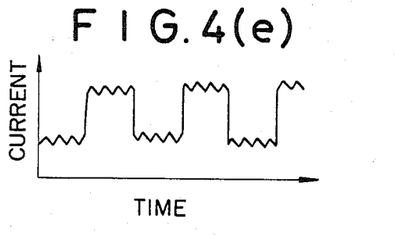
Figure 4F:
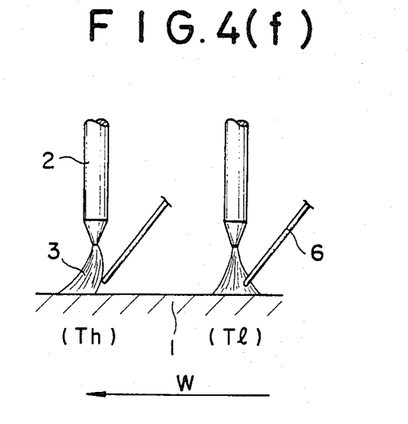
FIGS. 4(f) and 4(g) illustrate respectively deflection states of arc corresponding to the waveforms shown in FIGS. 4(a) and 4(d).
Figure 4G:
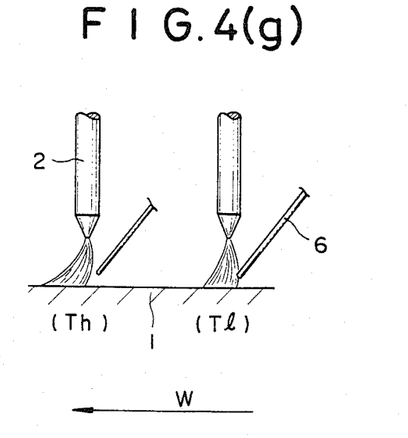

(4) In the above-mentioned case, the conduction current can also be modified into a pattern as shown in FIG. 4(d) or 4(e).

(5) A method of using the measure (2) in combination with the measure (4).

(6) A combination of measures (4) and (5).

(7) Modified forms of the foregoing measures are available by adding fine adjustments thereto according to the condition of the workpiece.

Figure 5:
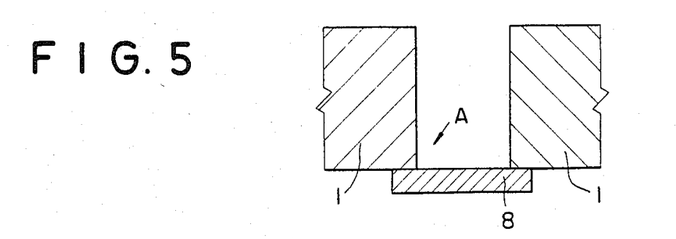
FIGS. 5 through 8 are diagrammatic cross-sectional views showing particular target portions of bevelings to which a welding arc is directed.
Figure 6:
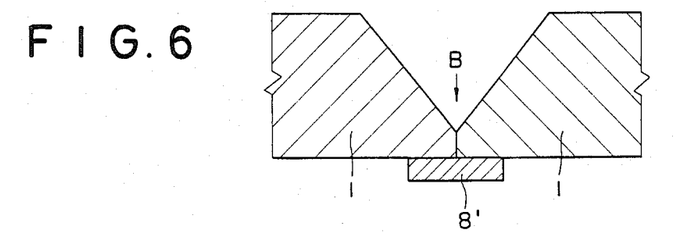
Figure 7:
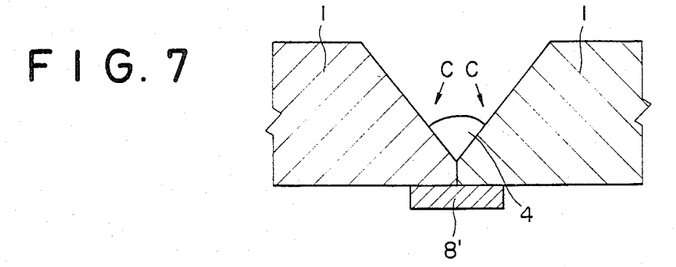
Figure 8:
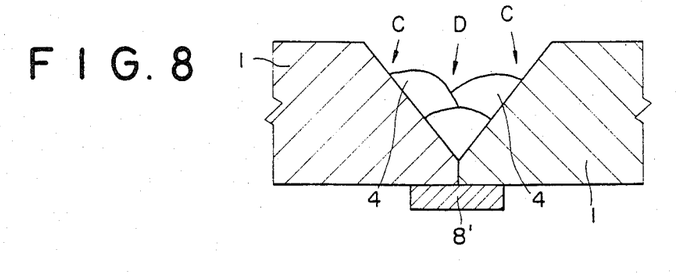

In addition to the above-mentioned conditions of the workpiece, there sometimes arises the necessity of considering those cases of welding which involve a beveling of a broad gap width. In such a case, it is required to oscillate the electrode 2 itself in a direction perpendicular to the line of travel, also oscillating the filler wire to follow the movements of the electrode. There are no limitations in the pattern of oscillation. Within the sphere of the present invention, the arc is basically deflected forward during its oscillation but it is to be understood that the present invention also includes modifications employing a control means for interrupting or weakening and intensifying the deflection. FIGS. 5 to 8 illustrate such operations, of which FIG. 5 shows a situation of welding aimed at an intersection A of a base metal 1 and a weld backing 8 in an I-beveling, FIG. 6 a situation of welding aimed at an intersection B of workpieces 1 (8' denotes a weld backing), FIG. 7 a situation of welding aiming at intersections C of a workpiece 1 and a welded bead 4, and FIG. 8 a situation of welding aimed at an intersection D of beads 4 in addition to C, respectively. When welding intersections in this manner, the above-mentioned oscillation is imparted no matter whether the position is downhand, vertical, horizontal or overhead. In this regard, the workpiece 1, welded bead 4 and backing 8 in the path of oscillation should be sufficiently preheated particularly at the intersecting portions A to D. Thus, it is one of most preferred forms of the present invention to incline the arc forwardly a sufficient degree by increasing the current particularly at the stage where the TIG arc is directed to the intersecting portion. The extent of deflection may be reduced in those areas other than the abovementioned intersecting portions A-D and in some cases may be interrupted by cutting off the current to the filler wire. It becomes possible to perform the welding operation in a further improved manner by combining these operations with the arc weaving.

Figure 10A:
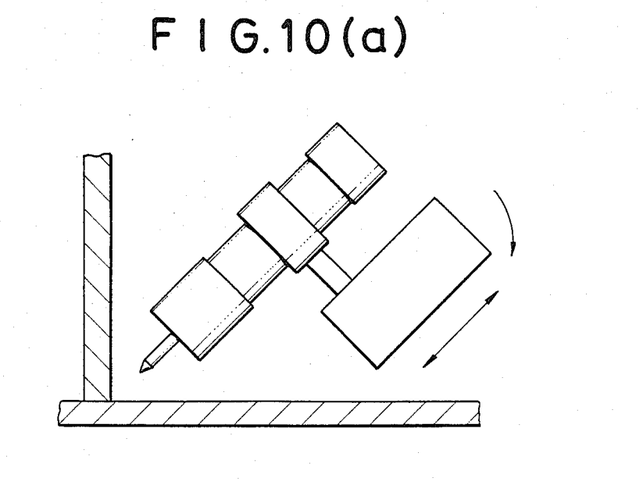
FIGS. 10(a) and 10(b) are schematic illustrations of an automatic arc voltage control mechanism according to the present invention.
Figure 10B:
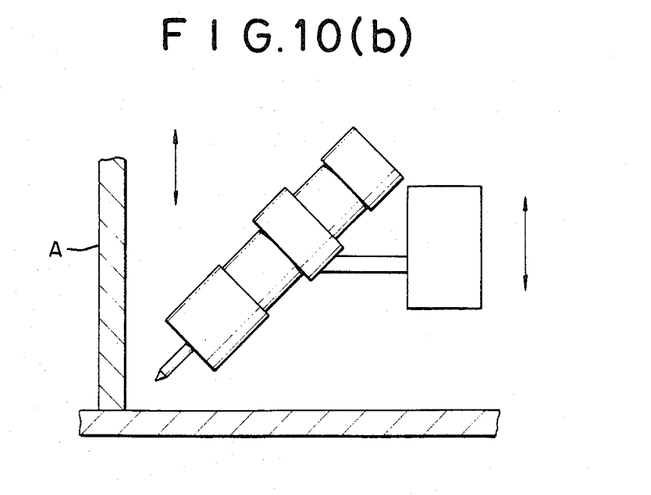

Reference is now had to FIGS. 10(a) and 10(b) which illustrate an oscillating mechanism for the torch oscillation and an arc extension control mechanism, hereinafter referred to as A.V.C. (automatic arc voltage control) for brevity. The oscillating mechanism is built into the A.V.C., the A.V.C. action being directed in the direction of the torch axis, for example, in horizontal fillet welding or sideward welding. Namely, when the torch alone is tilted as shown in FIG. 10(b), the direction of AVC action is disposed at an angle with the torch axis, so that the arc voltage is dropped in a case where the target of the torch is shifted toward a side plate A and the AVC action takes place in a y-direction in order to correct the voltage, lifting the torch continuously in the y-direction. Consequently, it is increasingly deviated from a welding spot and the welding operation has to be interrupted. However, such problem is eliminated in the situation of FIG. 10(a). Although the example of FIG. 10 shows horizontal fillet welding, the same applies to the case of tilting the torch portion forwardly. In this case as described hereinafter, a joint portion 205 of the oscillator 205 is angularly adjusted in the arrowed directions in FIG. 16. Therefore, the direction of action of the arc extension control is desired to be parallel with the longitudinal axis of the arc and, in the mechanism of FIG. 10 which integrally incorporates the A.V.C. function, the oscillation mechanism itself is required to be tilted in parallel relation with the torch axis.

Referring to FIGS. 11 through 15, the oscillation mechanism according to the present invention is constituted by a drive casing 101 and a movable casing 102, the drive casing 101 being mounted on a welding carriage or a welding head. On the other hand, the movable casing 102 is mounted on the fore ends of slide shafts 103 and 103a which are projected from and are slidable into and out of the drive casing 101. A pair of slide shafts 105 and 105a are mounted within the movable casing 102 perpendicularly to the first mentioned slide shafts 103 and 103a. A slide member 106 is slidably fitted on the slide shafts 105 and 105a in a bridging manner, supporting thereon a torch through a torch holder 104. On the other hand, the slide member 106 is moved by rotation of a pinion 115 which is meshed with a rack member 109 on the slide member 106 and driven from a lift motor 108 provided within the drive casing 101. The movable casing 102 is moved by the slide shafts 103 and 103a toward and away from the drive casing 101, so that the pinion 115 is connected to the lift motor 108 though a telescopically splined connecting shaft. Namely, as shown particularly in FIG. 13, a splined shaft assembly 110 includes a spline bearing 111 which is loosely fitted in a support wall, an output shaft fitting 112 provided on the side of the motor and fitted in one end portion of the spline bearing 111, and a spline shaft 113 fitted into the other end portion of the bearing 111 and having the pinion 115 securely fixed to its outer end. Indicated by reference number 114 is a shaft which supports the pinion 115 and by 116 a dust proof bellows.

Figure 11:
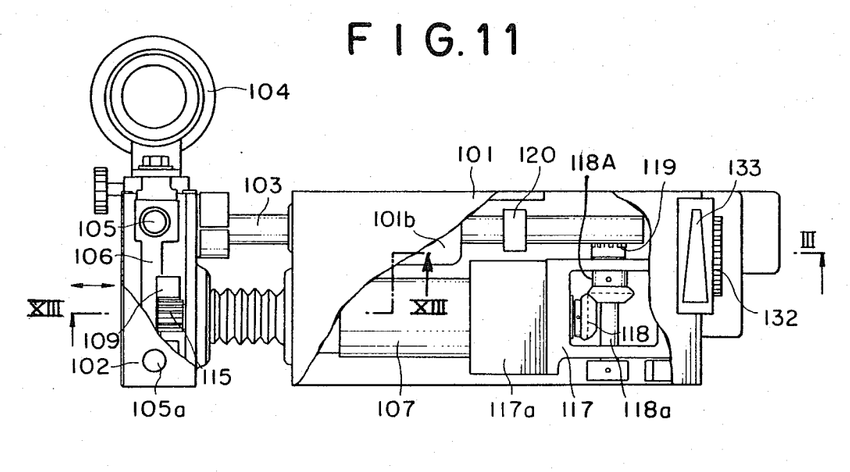
FIG. 11 is a partly cutaway plan view of an arc oscillating mechanism according to the present invention.
Figure 12:
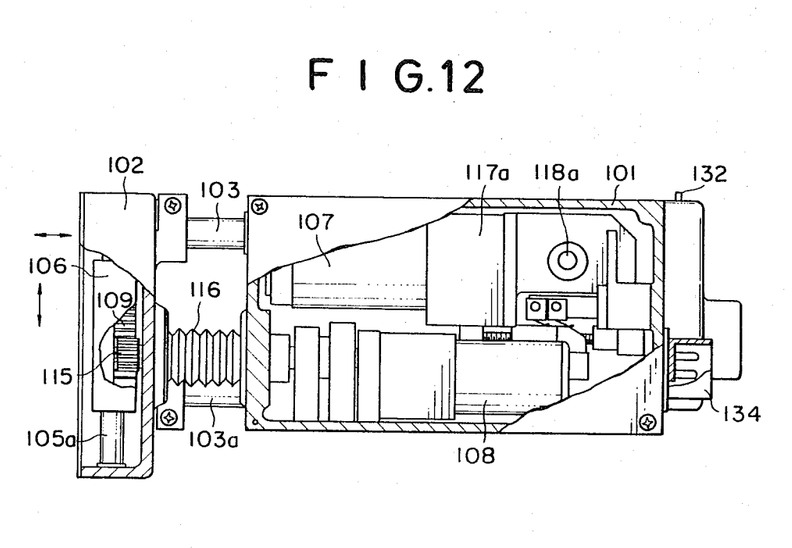
FIG. 12 is a partly cutaway bottom view of the oscillating mechanism of FIG. 11.
Figure 13:
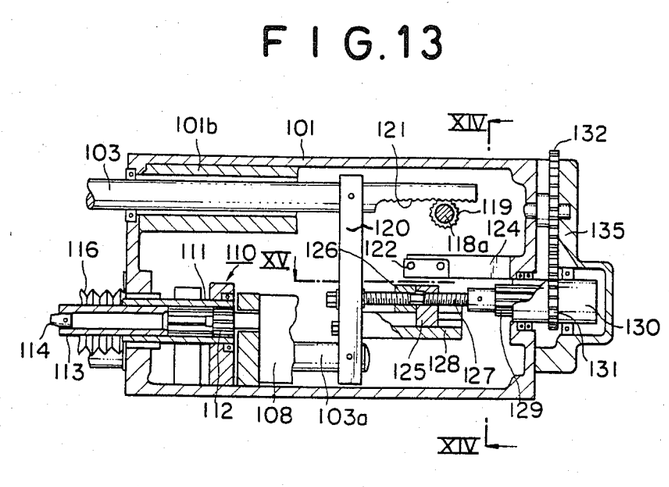
FIG. 13 is a sectional view taken on line XIII—XIII of FIG. 11.
Figure 14:
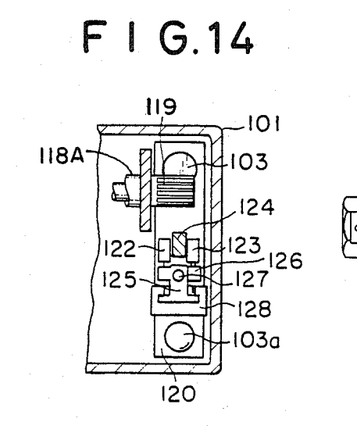
FIG. 14 is a fragmentary sectional view taken on line XIV—XIV of FIG. 13.

On the other hand, the slide shafts 103 and 103a are sliding moved by a weaving motor 107, the distance of their reciprocal movements being freely adjustable from outside the drive casing 101 to obtain movements of a constant speed over a desired distance. More particularly, the slide shafts 103 and 103a are loosely fitted respectively in boss members 101b which are integrally formed with and in the drive casing 101. The slide shafts 103 and 103a are connected to each other by a link member 120 which is fitted on the inner end portions of the respective slide shafts. The slide shaft 103a is driven by the slide shaft 103 through the link member 120, and the slide shaft 103 is in turn driven by a rack 121 which is formed on one part thereof. Therefore, the slide shaft 103 is greater in length and has its inner end extended behind the link member 120, the rear extension of the slide shaft 103 being formed with rack teeth 121. Alternatively, a separately formed rack may be attached to the slide shaft 103, if desired. A pinion 119 which is meshed with the rack teeth 121 is securely mounted on one end of a drive shaft 118a which is loosely fitted in a fixed bracket 117 provided in the drive casing 101. The drive shaft 118a is rotated by a miter gear 118 which is driven by the weaving motor 107 directly or through a clutch means 117a. Since the slide shaft 103 is reciprocally moved, it is necessary to provide means for adjusting the distance of its reciprocal movements (weaving width). To this end, the apparatus of the present invention is arranged to control the rotational direction and the time duration of rotation of the weaving motor 107 by switching the motor drive power source or the clutch 117a. More particularly, a support arm 124 is securely provided in the drive casing 101 in alignment with the locus of movement of the link member 120, the support arm 124 having limit switches 122 and 123 mounted on the opposite sides thereof.

Figure 15:
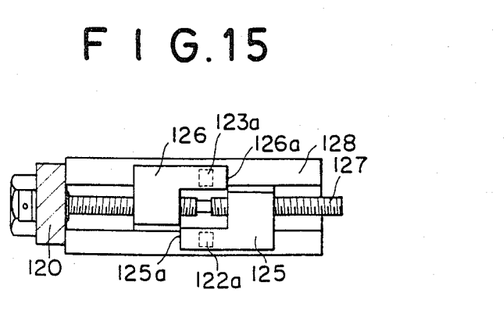
FIG. 15 is a sectional view taken in the direction of arrowed line XV—XV in FIG. 13.

A support seat 128 which is attached to the link member 120 is located immediately beneath the support arm 124 and provided with a couple of strikers 125 and 126 slidable in aligned positions. As shown more particularly in FIG. 14, the support seat 128 is provided with a slide groove in the form of a dovetail groove, slidably receiving foot portions on the bottom sides of the strikers 125 and 126. Alternatively, the support seat 128 may be constituted by a plurality of slide shafts or other suitable slide mechanism. The strikers 125 and 126 are provided with screw holes for threaded engagement with a screw rod 127 which is in the form of a double screw as shown in FIG. 15, having screw threads of inverse directions substantially on opposite sides of its median point. Therefore, the strikers 125 and 126 are moved toward each other by rotating the screw rod 127 in one direction and away from each other by rotating the screw rod 127 in the other direction. As shown in FIG. 15, the screw rod 127 has one end thereof (left end in that figure) loosely fitted in the link member 120 in such a manner as to block axial movement of the screw rod 127 while permitting its rotation. Therefore, the strikers 125 and 126 as well as the screw rod 127 slide integrally with the slide shaft 103 over a distance corresponding to the width of oscillation. The other end of the screw rod 127 is journalled in a wall of the drive casing 101 and a mounting member 135 through a spline joint as shown in FIG. 13. More particularly, a spline sleeve 130 is rotatably supported in a journal hole formed in a wall of the drive casing and the mounting member 135, receiving therein a spline shaft 129 in such a manner as to transmit to the latter rotation alone, permitting free movement of the spline shaft 129 in the axial direction. The other or outer end of the screw rod 127 is coupled with the spline shaft 129. Thus, oscillation is produced by sliding movements of the spline shaft 129 within the spline sleeve 130. Unless the sleeve 130 is rotated, the strikers 125 and 126 are held in predetermined spaced positions.

The top faces of the strikers 125 and 126 are opposingly associated with the limit switches 122 and 123, for which microswitches are employed by way of example of the particular embodiment shown, the microswitches having respective operating contacts 123a and 122a held in contacting engagement with the top surfaces of the strikers 126 and 125, respectively. (FIG. 15) These limit switches 122 and 123 are arranged to operate a rotation control switch of the weaving motor 107 or an electromagnetic clutch switching means for the clutch 117a, one of the limit switches being insensitive when the other one is sensitive.

Thus, if the link member 120 is moved, for example, to the left in FIG. 15, by the switch 123a and striker 126, the end portion 126a reaches and actuates the switch 123a to reverse the drive direction as mentioned hereinbefore and at the same time to put the switch 122 in sensitive state. As a result, movement is reversed and the switch 122a reaches the end of the striker 125, switching again the direction of movement in the same manner. Therefore, in this particular embodiment, the distance between the operating ends 125a and 126a of the strikers 125 and 126 corresponds to the width of oscillation. The width of oscillation can be freely adjusted by turning the screw rod 127.

Now, in order to alter the width of oscillation, a gear 131 which is fixedly provided on the outer periphery of the spline sleeve 130 is engaged with a handle gear 132 which is rotatably supported on the mounting member 135. Part of the handle gear 131 protrudes out of the drive casing 101 so that the screw rod 127 can be manually rotated from outside. Designated at 133 (in FIG. 11) is an indicator plate which shows rotational angles of the handle gear 132 in relation to the widths of oscillation, and at 134 a plug socket for connection to a power supply.

The thus constructed oscillating mechanism of the present invention moves the slide shaft 103 through a rack and pinion so that a constant speed can be continuously maintained irrespective of alterations in the width of oscillation to permit welding under optimum conditions. In addition, the construction is compact, easy to handle and capable of ensuring stable operations over a long period of time.

Figure 16:
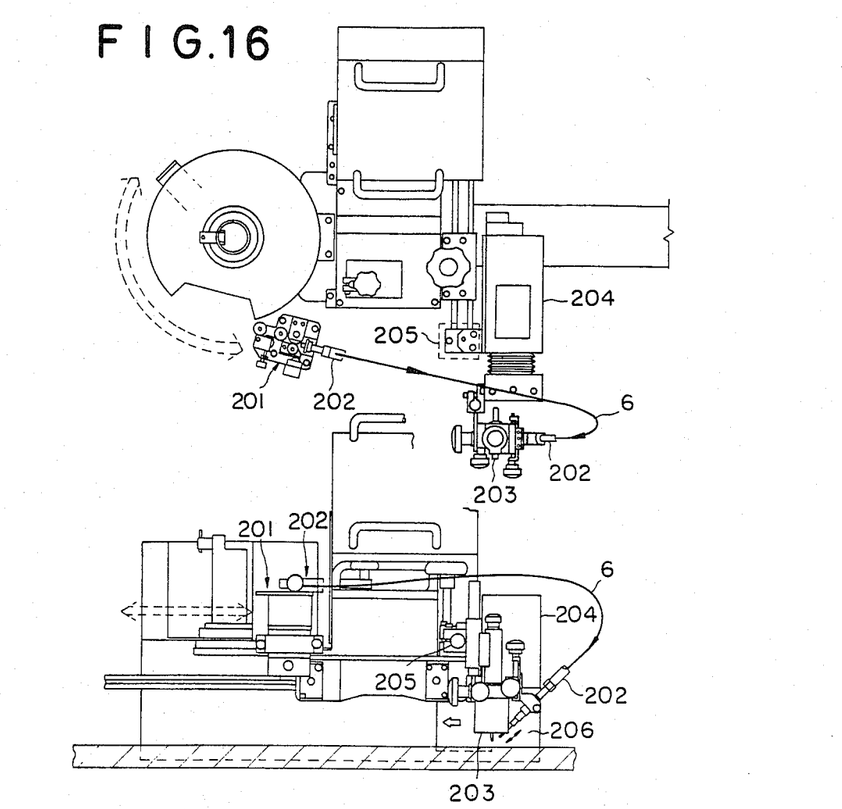
FIG. 16 is a schematic side elevation of an apparatus according to the invention.

Referring now to FIG. 16, the filler wire and a wire feeder 201 are located forward of the torch as seen in the direction of travel. This is because, when there is a steel plate or other obstacle at a starting point as in FIG. 10(a), a filler wire and wire feeder located on the rear side of the torch contrary to FIG. 16 would have difficulty in reaching the starting point and would have to leave a long unwelded portion at that point. Therefore, the filler wire and wire feeder are preferred to be located as shown in FIG. 16.

The wire feeder 201 is preferably rotatable as indicated by arrows of broken line. In a case where the wire carries electric current, it is fed toward the molten pool around the rear side of the torch. However, in ordinary TIG welding using a dead filler wire, it can be fed from the front side. Namely, it is possible to complete the welding operation up to the final layer by increasing the deposition rate with use of a current-carrying filler wire. However, the occurrence of excess metal is increased due to a high melting rate as compared with ordinary TIG welding. This is the main reason why ordinary TIG welding is permitted.

Figure 17:
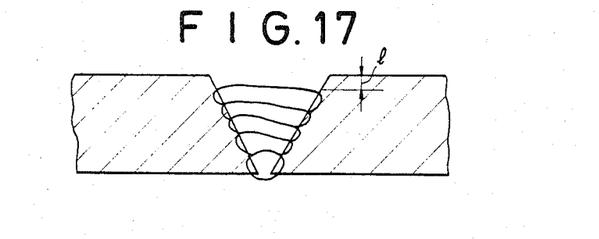
FIG. 17 is a diagrammatic cross-section showing the overlaying conditions.

The metal deposition up to the penultimate layer depends on the beveling angle, root gap and dislocation. Namely, since variations occur in the dimension l of FIG. 17 depending upon these factors, the deposition rate is adjusted before finishing the final layer. However, the reduction of feed rate of a current-carrying filler wire is limited as the conduction of electric current becomes meaningless and the bead is disturbed if the wire falls short of the molten pool. Further, the bead appearance is deteriorated when a dead wire is fed from the rear side as compared with a case where it is fed from the front side. As clear from the foregoing description, the apparatus of the present invention permits ordinary TIG welding as well.

In this instance, a problem arises in that a flexible tube 202 which covers the filler wire 6 between the motor-driven wire feeder and the torch portion, guiding the wire 6 around the rear side of the torch portion becomes too lengthy and has to be attached in a largely bent form when it is used for feeding the wire from the front side of the torch, picking up a bending habit or increasing the feed resistance to lower the operation quality. Therefore, it becomes necessary to provide another flexible conduit which is used exclusively for the front feed. A problem of this sort is avoided by providing a wire feeder 201 which is rotatable in the directions indicated by broken lines in FIG. 16 to allow use of a single and the same flexible conduit for both front and rear feeds. Furthermore, in order to tilt the torch portion 203 forwardly, a joint portion 205 of the oscillator 204 is angularly adjusted in the arrowed directions.

It will be appreciated from the foregoing description that, according to the direct current TIG welding method and apparatus of the present invention, sound, high-efficiency welding becomes possible in all positions. The present invention is not limited by the foregoing particular embodiments and permits various alterations and modifications in the shape of component parts or in the manner of carrying out the described method within the scope as encompassed by the appended claims.

What is claimed as new and desired to be secured by Letters Patent of the United States is:

1. A welding method which comprises the steps of:
   (a) connecting a non-consumable electrode and filler wire to independent DC power sources, the non-consumable electrode being located in a position forward of the filler wire as seen in the direction of travel;
   (b) maintaining the following angular relationships during welding:
      (i) an angle $\theta_1$ of between 20° and 60° between the non-consumable electrode and the filler wire;
      (ii) an angle $\theta_2$ of between 60° and 85° between the non-consumable electrode and the workpiece;
      (iii) an angle $\theta_3$ of between 50° and 75° between the filler wire and the workpiece;
      (iv) an angle $\theta_4$ of between the molten pool surface and the surface of the welded base metal of between 35° and 60° for vertical welding and of between 35° and 45° for horizontal, downhand, or overhead wleding; and (v) an angle $\theta_5$ of not less than 15° between the molten pool surface and the filler wire;
(c) applying electric current having opposite directions to the non-consumable electrode and the filler wire;
(d) pulsating the current applied to the filler wire so as to weave the arc produced across the non-consumable electrode and the workpiece along a line lying in the direction of travel;
(e) oscillating the non-consumable electrode and the filler wire in the direction perpendicular to the direction of travel in the plane of the workpiece; and
(f) varying the amplitude of the pulsating current to compensate for abnormalities along the weld line.

2. A welding method as recited in claim 1 wherein the angle $\theta_1$ is maintained between 30° and 50° during welding.

3. A welding method as recited in claim 2 wherein the angle $\theta_1$ is maintained between 45° during welding.

4. A welding method as recited in claim 1 wherein the angle $\theta_5$ is maintained at 15° during welding.

5. A welding method as recited in claim 1 wherein the pulsating current carried by the filler wire consists of alternate conducting and non-conducting periods.

6. A welding method as recited in claim 1 wherein the pulsating current carried by the filler wire consists of alternate high and low periods of relatively large and small amplitudes.

7. A welding method as recited in claim 1 wherein a broad gap width is being beveled and a weld backing is placed behind the intersection of two workpieces, said method further comprising the steps of:
(a) inclining the arc forwardly by increasing the current when the arc is directed to an intersection between the workpiece and the weld backing and
(b) reducing the extent of the deflection of the arc when the arc is not directed to an intersection between the workpiece and the weld backing.

* * * * *